US011983694B2

(12) United States Patent
Ikegami

(10) Patent No.: US 11,983,694 B2
(45) Date of Patent: May 14, 2024

(54) INFORMATION PROCESSING DEVICE FOR RETAIL TRANSACTION PROCESSING SYSTEMS

(71) Applicant: TOSHIBA TEC KABUSHIKI KAISHA, Tokyo (JP)

(72) Inventor: Fumihiko Ikegami, Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 21 days.

(21) Appl. No.: 17/976,496

(22) Filed: Oct. 28, 2022

(65) Prior Publication Data

US 2023/0222481 A1 Jul. 13, 2023

(30) Foreign Application Priority Data

Jan. 12, 2022 (JP) ................. 2022-003005

(51) Int. Cl.
*G06Q 20/32* (2012.01)
*G06Q 20/40* (2012.01)
*G06Q 30/06* (2023.01)

(52) U.S. Cl.
CPC ....... *G06Q 20/3227* (2013.01); *G06Q 20/401* (2013.01); *G06Q 30/06* (2013.01); *G06Q 2220/00* (2013.01)

(58) Field of Classification Search
None
See application file for complete search history.

(56) References Cited

U.S. PATENT DOCUMENTS 8,717,599 B2    5/2014  Ochiai
2018/0278415 A1*  9/2018  Von Der Lippe ..... H04L 9/0897

* cited by examiner

*Primary Examiner* — Joseph W. King
(74) *Attorney, Agent, or Firm* — Kim & Stewart LLP

(57) ABSTRACT

According to one embodiment, an information processing device connectable to peripheral devices for retail transaction processing includes an interface for connecting to a plurality of peripheral devices, a storage unit including an unrestricted storage area and a restricted storage area, and a processor. The processor is configured to acquire device information from each of the plurality of peripheral devices connected to the interface, identify whether the acquired device information meets to a first condition, generate a first key from at least a portion of the acquired device information if the first condition is met, then use the generated first key to unlock a first area of the restricted storage area. The processor then executes a first processing program that was stored in the unlocked first area.

20 Claims, 4 Drawing Sheets

INFORMATION PROCESSING DEVICE FOR RETAIL TRANSACTION PROCESSING SYSTEMS

CROSS-REFERENCE TO RELATED APPLICATION

This application is based upon and claims the benefit of priority from Japanese Patent Application No. 2022-003005, filed Jan. 12, 2022, the entire contents of which are incorporated herein by reference.

FIELD

Embodiments described herein relate generally to an information processing device.

BACKGROUND

A function of a POS terminal device can already be provided by attaching an external device such as a scanner to an otherwise general-purpose information processing device, such as a tablet-type computer device, and causing the information processing device to execute a software program or the like for performing retail transaction processing.

However, in order to begin using such a POS terminal device, an information processing program for the transaction processing must be installed on the information processing device.

Therefore, it is conceivable to pre-install the transaction processing program on the information processing device. However, in such a case, it may not always be possible to limit use of the information processing device to only the execution of transaction processing, thus the provider of the information processing device might not be able to impose restrictions on the use of the information processing device.

Under these circumstances, it is desired to pre-install the information processing program on the information processing device and restrict use of the information processing device to the execution of the transaction processing program.

DETAILED DESCRIPTION

Described embodiments provide an information processing device in which an information processing program can be pre-installed and while providing a restriction on use of the device to execution of the pre-installed information processing program.

In general, according to one embodiment, an information processing device connectable to peripheral devices for retail transaction processing includes an interface for connecting to a plurality of peripheral devices, a storage unit including an unrestricted storage area and a restricted storage area, and a processor. The processor is configured to acquire device information from each of the plurality of peripheral devices connected to the interface, identify whether the acquired device information meets to a first condition, generate a first key from at least a portion of the acquired device information if the first condition is met, then use the generated first key to unlock a first area of the restricted storage area. The processor then executes a first processing program that was stored in the unlocked first area.

Hereinafter, an example embodiment is described with reference to the drawings.

Figure 1:
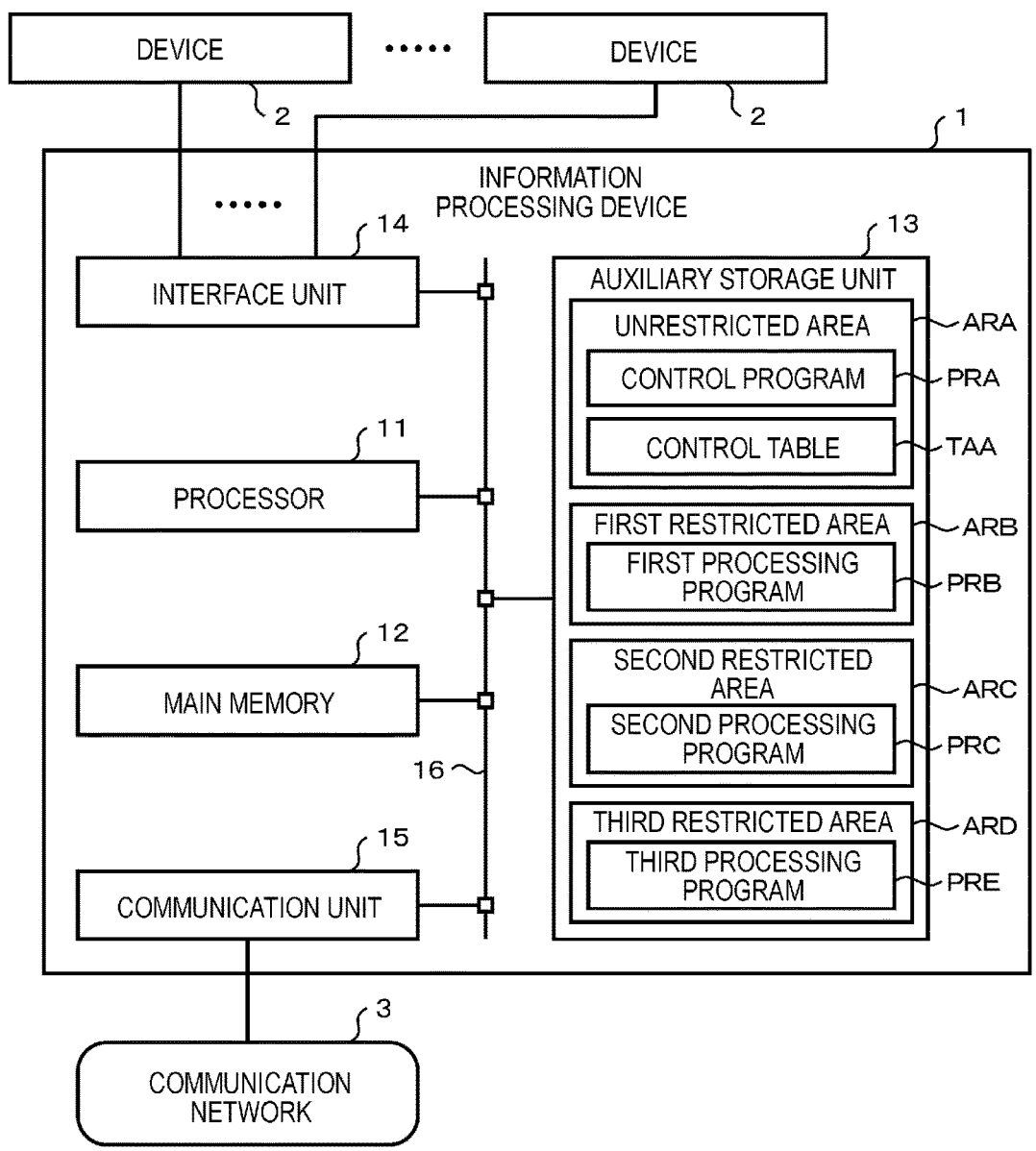
FIG. 1 is a block diagram of an information processing device according to an embodiment.

FIG. 1 is a block diagram of an information processing device 1 according to the present embodiment.

The information processing device 1 includes a processor 11, a main memory 12, an auxiliary storage unit 13, an interface unit 14, a communication unit 15, and a transmission line 16. The information processing device 1 can be based on general-purpose computer devices of various types such as a tablet type computer or a desktop type computer.

The processor 11, the main memory 12, and the auxiliary storage unit 13 are connected to each other via the transmission line 16. These connected components correspond to a computer for executing information processing of various types.

The processor 11 executes information processing based on an information processing program such as an operating system, middleware, and application programs stored in the main memory 12 and the auxiliary storage unit 13.

The main memory 12 includes a non-volatile memory area and a volatile memory area. The main memory 12 stores the information processing program in the non-volatile memory area. The main memory 12 may store data required for executing various kinds of information processing by the processor 11 in a non-volatile or volatile memory area. The main memory 12 uses the volatile memory area as a work area to which data can be appropriately rewritten by the processor 11.

The auxiliary storage unit 13 can be a storage device such as an electric erasable programmable read-only memory (EEPROM), a hard disc drive (HDD), and a solid-state drive (SSD). The auxiliary storage unit 13 stores data used when the processor 11 executes various kinds of information processing or data generated by the processor 11. The auxiliary storage unit 13 may store the information processing program. In the present embodiment, a storage unit having an encryption function is used as the auxiliary storage unit 13. For example, a known type of storage device referred to as a self-encrypting drive can be used.

The interface unit 14 includes a plurality of ports for connection to a plurality of devices 2. Note that in some examples, of the devices 2 may be connected to a port of the interface unit 14 via a hub or the like. Accordingly, the interface unit 14 in some examples may include only one port that is connected to such a hub. If the information processing device 1 is for performing transaction processing or the like, the devices 2 may, include a display, a keyboard, a magnetic reader, a scanner, a printer, and a payment machine, for example. As the interface unit 14, a general-purpose device interface can be used, for example. According to the present embodiment, the interface unit 14 conforms to the universal serial bus (USB) standard. Therefore, the devices 2 are a type of device using the USB interface or, in some examples, adapters may be provided between the device 2 and the interface unit 14.

The communication unit 15 performs a process for data communication via a communication network 3.

The transmission line 16 includes an address bus, a data bus, a control signal line, and the like. The transmission line 16 transmits data and signals transmitted and received between connected units.

The storage area of the auxiliary storage unit 13 is divided into a non-restricted area ARA, a first restricted area ARB, a second restricted area ARC, and a third restricted area ARD. These storage areas are, for example, separate partitions.

The auxiliary storage unit 13 stores a control program PRA and a control table TAA in the non-restricted area ARA, without encryption. The control program PRA is an application program including instructions for performance of a procedure of control processing to be described below. The control table TAA is a data table prepared in advance for reference during the control processing.

The auxiliary storage unit 13 stores various programs and various items of data in the first restricted area ARB, the second restricted area ARC, and the third restricted area ARD in an encrypted state. For the first restricted area ARB, the second restricted area ARC, and the third restricted area ARD, the auxiliary storage unit 13 decrypts the various stored programs and pieces of data for output only when in in an unlocked state entered in response to a release request designating a predetermined key(s) for these respective areas. That is, with respect to the first restricted area ARB, the second restricted area ARC, and the third restricted area ARD, the auxiliary storage unit 13 restricts access when in a locked state. The first restricted area ARB, the second restricted area ARC, and the third restricted area ARD store a first processing program PRB, a second processing program PRC, and a third processing program PRD, respectively. Each of the first processing program PRB, the second processing program PRC, and the third processing program PRD are application programs. The first processing program PRB, the second processing program PRC, and the third processing program PRD provide instructions for the information processing to be performed in association with the transmission and reception of data from the various devices 2 connected to the interface unit 14. For example, if the information processing device 1 is to be operated as a transaction processing device, it is assumed that all of the first processing program PRB, the second processing program PRC, and the third processing program PRD describe procedures for transaction processing using data from a device 2 (which may be, for example, a product scanner).

Figure 2:
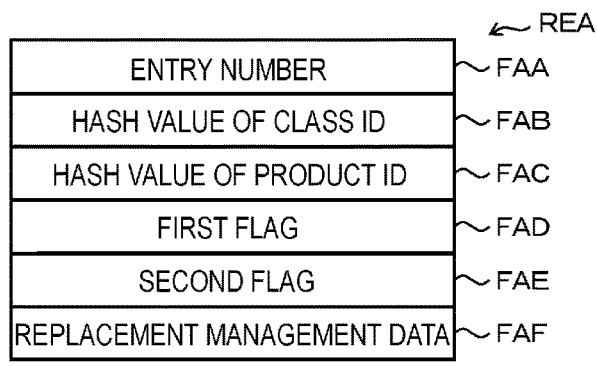
FIG. 2 depicts a control table according to an embodiment.

FIG. 2 is a diagram schematically illustrating a configuration of a data record REA included in the control table TAA.

The control table TAA comprises a set of data records REA correlated to different possible types of devices that can be connected to the interface unit 14 as the devices 2.

A data record REA includes fields FAA, FAB, FAC, FAD, FAE, and FAF. An entry number as an identifier for identifying the respective data record REA in the control table TAA is set in the field FAA. A class identifier (ID) assigned for correlating the type of the device is set in the field FAB. The class IDs are identifiers for respective classes that roughly (generically) classify the various possible device types by functions and may be defined by the USB standards, for example. A product ID assigned for a correlating device type is set in the field FAC. The product IDs are identifiers assigned by a supplier of the particular device 2 and can be used to identify different models of the various devices manufactured (or otherwise provided) by the supplier thereof. A first flag value ("first flag") is set in the field FAD. The first flag is data showing whether the connection of the correlating type of device is essential. A second flag value ("second flag") is set in the field FAE. The second flag is data showing whether a predetermined ID relating to the type of device is to be used for generation of a key. Replacement management data for managing replacement of the type of device is set in the field FAF.

Next, an operation of the information processing device 1 is described. The details of the processes described below are examples, and a change of a procedure of processes, omission of processes, addition of other processes, and the like can be appropriately performed.

The information processing device 1 has a first mode, a second mode, and a third mode as possible operation modes. The first mode is an operation mode for executing information processing based on the first processing program PRB when a device 2 determined as a key device in advance is included among the devices 2 connected to the interface unit 14. The second mode is an operation mode for executing the information processing based on the second processing program PRC when all predetermined devices including a device 2 determined as a key device are included among the devices 2 connected to the interface unit 14. The third mode is an operation mode for executing the information processing based on the third processing program PRD when the predetermined devices including a device 2 determined as a key device are included among devices 2 connected to the interface unit 14, and additionally a device for which replacement is prohibited is present among the devices 2. One of these first, second, and third modes can be appropriately selected by a user and/or determined as an operation mode of the information processing device 1.

When the information processing device 1 is first activated, the processor 11 starts control processing according to the control program PRA.

Figure 3:
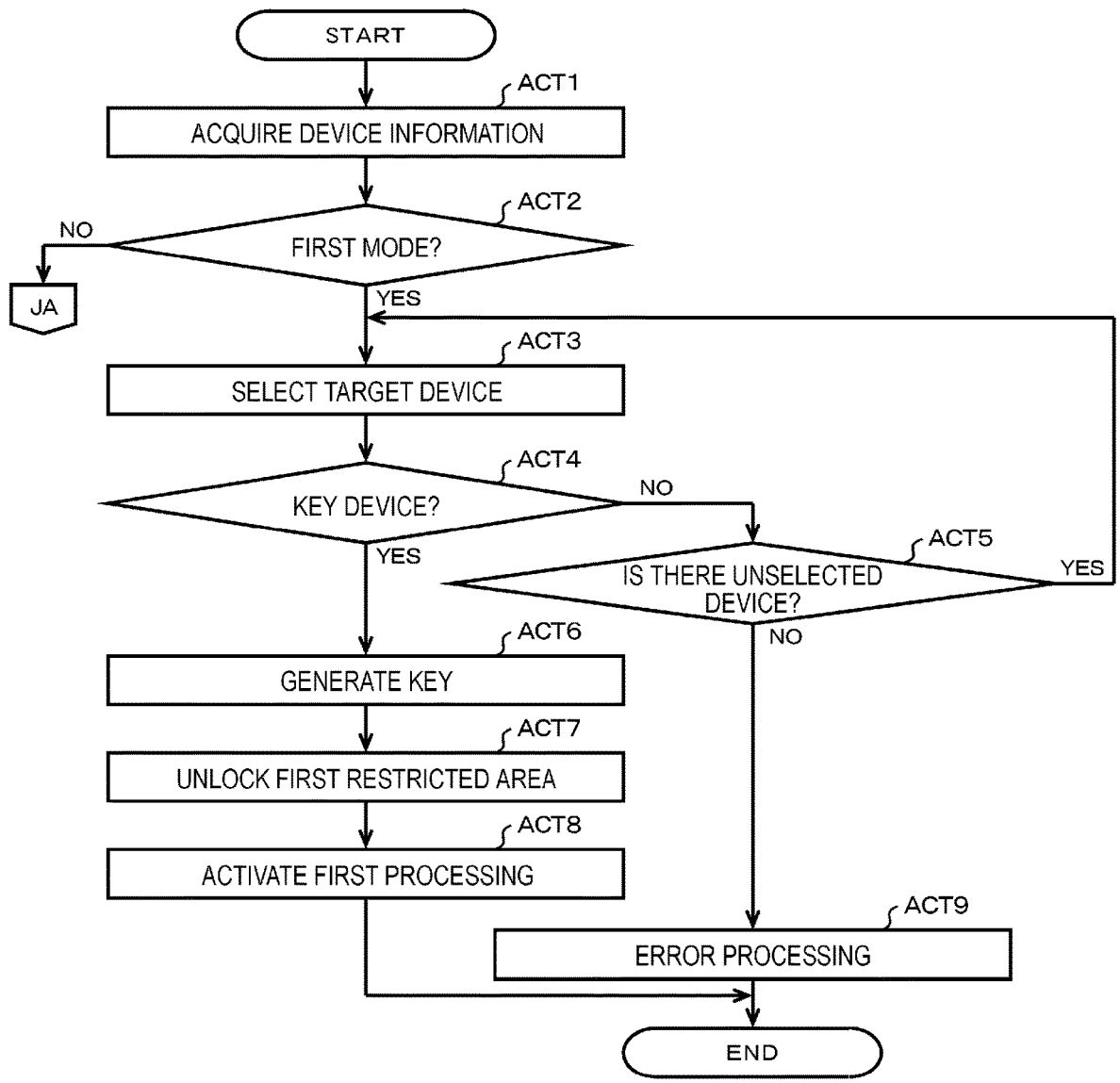
FIG. 3 is a flowchart of control processing by a processor of an information processing device according to an embodiment.
Figure 4:
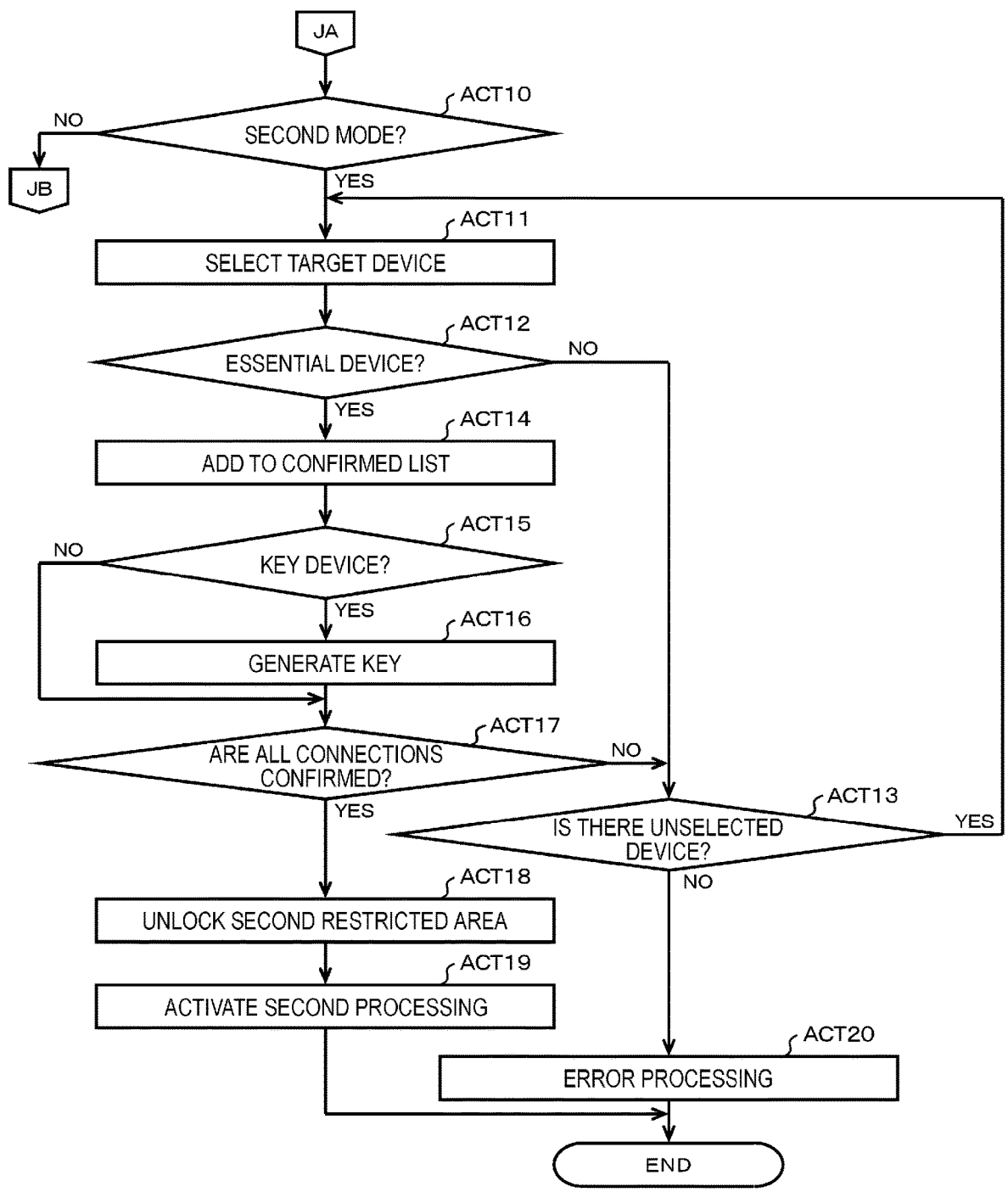
FIG. 4 is a flowchart of control processing by a processor of an information processing device according to an embodiment.
Figure 5:
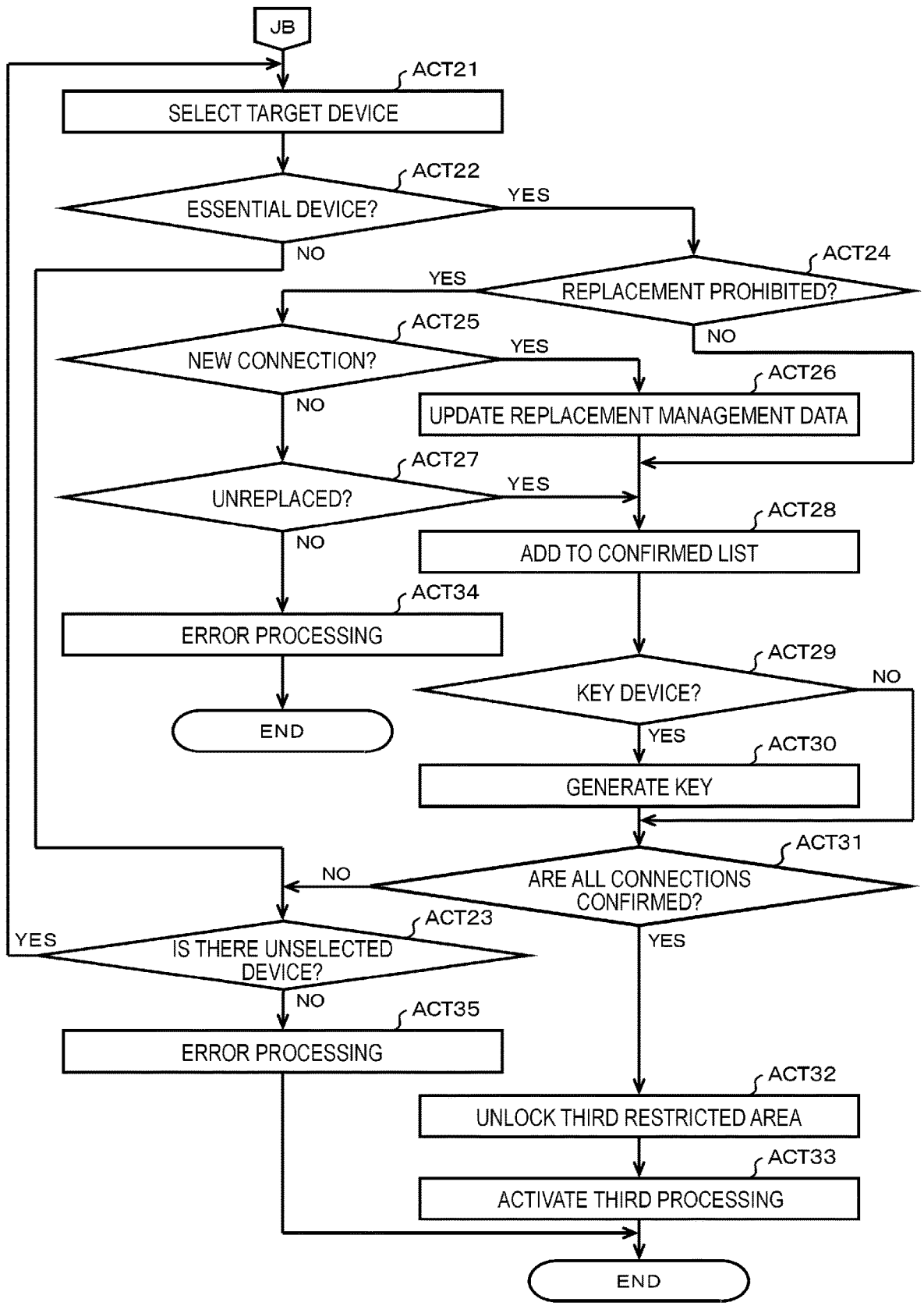
FIG. 5 is a flowchart of control processing by a processor of an information processing device according to an embodiment.

FIGS. 3, 4, and 5 are flowcharts of the control processing by the processor 11.

In ACT 1 in FIG. 3, the processor 11 obtains device information of all the devices 2 connected to the interface unit 14. Here, at least a class ID, a product ID, and a serial number are included in the obtained device information. The processor 11 may obtain other information such as a vender ID. The processor 11 stores the obtained device information in the main memory 12 or the auxiliary storage unit 13.

In ACT 2, the processor 11 checks whether the first mode is set as the operation mode of the information processing device 1. If the processor 11 determines YES, it proceeds to ACT 3.

In ACT 3, the processor 11 selects one of the devices 2 connected to the interface unit 14 as a device to be confirmed (this selected device is referred to as a target device in this context).

In ACT 4, the processor 11 checks whether the target device is a key device. Here, a key device is a device 2 for which the product ID used for generating a key for unlocking the first restricted area ARB is set. Also, the processor 11 calculates hash values respectively relating to the class ID and the product ID, for example, by operating hash functions respectively predetermined by using the class ID and the product ID obtained from the target device as arguments. Also, the processor 11 searches the control table TAA for the data record REA, for example, in which two hash values are respectively set in the fields FAB and FAC. If the second flag set in the field FAE of the corresponding data record REA shows that the ID is not used for generating the key, the processor 11 determines NO (since the target device is not a key device) and proceeds to ACT 5. In addition, if the corresponding data record REA cannot be found at all, the processor 11 determines by default that the target device is not a key device.

The key device(s) can be appropriately determined, for example, by a designer of the information processing device 1. Such a device may be a device 2 that must necessarily be used for performing the information processing based on the first processing program PRB, the second processing program PRC, and the third processing program PRD. For example, if processing for causing a printer to execute printing is necessarily included in the information processing based on the first processing program PRB, the second processing program PRC, and the third processing program PRD, a device 2 that is a printer can be set as the key device.

In ACT 5, the processor 11 checks whether there is still a device 2 that has not yet been selected as the target device among the devices 2 connected to the interface unit 14. If there is an unselected device 2 present, the processor 11 determines YES and performs ACT 3 and subsequent processes in the same manner as described above on a previously unselected device 2.

In ACT 4, if a second flag set in the field FAE of the searched data record REA shows that the ID is used for generating the key, the processor 11 determines YES (since the target device is a key device) and proceeds to ACT 6.

In ACT 6, the processor 11 generates a key for unlocking the first restricted area ARB. For example, the processor 11 uses, as a key, a hash value obtained using the product ID of the target device as an argument. In addition, the method of generating a key may be any other method.

In ACT 7, the processor 11 unlocks the first restricted area ARB using the generated key. The processor 11 requests unlocking of the first restricted area ARB from the auxiliary storage unit 13 and provides/designates the key generated in ACT 6. With respect to the first restricted area ARB, the key generated in ACT 6 is predetermined as a key for unlocking. Therefore, the auxiliary storage unit 13 unlocks the first restricted area ARB in response to the request from the processor 11. In this unlocked state, the auxiliary storage unit 13 provides decrypted versions of the programs and data stored in the first restricted area ARB. In addition, in this unlocked state, the auxiliary storage unit 13 may store data in the first restricted area ARB after encryption according to a request for writing to the first restricted area ARB.

In ACT 8, the processor 11 activates the information processing based on the first processing program PRB. That is, the processor 11 starts the execution of the information processing based on the first processing program PRB. For example, the processor 11 starts new processing as a thread different from the overall control processing. Also, in this example, the processor 11 ends the control processing after either activating first processing (ACT 8) or not finding any of the connected devices 2 to be a key device.

If the first mode is set as the operation mode in this manner, the information processing based on the first processing program PRB starts after the device 2 set as the key device has been connected to the interface unit 14.

It is assumed that the processor 11 in this example writes highly secure data such as a payment log and/or customer privacy information into the first restricted area ARB during the information processing based on the first processing program PRB.

If the information processing based on the first processing program PRB is executed, the processor 11 executes information processing according to the instructions of the first processing program PRB, which may be stored in the auxiliary storage unit 13. Also, since the processor 11 also executes information processing based on the control program PRA, the processor 11 also functions as control unit that allows the execution of the information processing based on the first processing program PRB only if a connection circumstance of the information processing device 1 device satisfies a predetermined condition.

Thus, if the device 2 set as the key device is not connected to the interface unit 14, the processor 11 determines NO in ACT 4. In ACT 5, if all devices 2 have already been selected (that is, there are no remaining unselected devices 2) the processor 11 determines NO in ACT 5 and proceeds to ACT 9 (error processing).

In ACT 9, the processor 11 executes an error processing. The specifics of the processing to be executed as error processing in ACT 9 may be set by the designer of the information processing device 1. For example, a notification operation can be performed for notifying a user that the connections of the information processing device 1 to the device(s) 2 is not correct. Such a notification may indicate to the user that the intended processing/functions cannot be performed. After the error processing, the processor 11 ends the control processing.

In ACT 2, if the first operation mode is not set, the processor 11 determines NO and proceeds to ACT 10 in FIG. 4.

In ACT 10, the processor 11 checks whether the operation mode of the information processing device 1 has been set to the second mode. If second operation mode is set, the processor 11 determines YES and proceeds to ACT 11.

In ACT 11, the processor 11 selects one of the devices 2 connected to the interface unit 14 as the target device.

In ACT 12, the processor 11 checks whether the target device is an essential device. In this context, an essential device is any device 2 determined beforehand as necessary to be connected to the interface unit 14 when the information processing device 1 is to be operated in the second mode.

Which devices 2 are set as essential devices may be freely determined by a designer or a manager of the information processing device 1. For example, if the designer decides to allow the use of functions related to the second processing program PRC only when a display, a keyboard, a magnetic reader, a scanner, a printer, and a payment machine are each connected to the interface unit 14, these particular devices 2 would be set as essential devices. Also, a first flag (set in the field FAD of the data record REA can be used to show that the connection of a corresponding device type is essential or not.

The processor 11 calculates hash values for the class ID and the product ID, respectively, according to preset hash functions with the class ID and the product ID of the target devices set as arguments.

In an example, when the control table TAA is searched for a data record REA in which the two calculated hash values are included (in the fields FAB and FAC) and the first flag (in the field FAD) of the corresponding data record REA does not show the connection is essential, the processor 11 determines NO in ACT 12 (since the target device is not essential device according to the setting of the first flag), and proceeds to ACT 13. It is noted that, if a corresponding data record REA cannot be found based on the calculated hash values, the processor 11 can determine that the target device is not an essential device.

In ACT 13, the processor 11 checks whether a device 2 that is not yet been selected as the target device is present among all the devices 2 connected to the interface unit 14. If such a device 2 is present, the processor 11 determines YES in ACT 13 and returns to ACT 11.

In ACT 12, if the first flag set in the field FAD of the current target device, the connection of such device 2 is considered essential, thus the processor 11 determines YES and proceeds to ACT 14.

In ACT 14, the processor 11 adds the target device to a confirmed list. If ACT 14 is being performed for the first time, the processor 11 may generate a confirmed list and store the confirmed list in the main memory 12 or the auxiliary storage unit 13. If ACT 14 is being performed for the second or subsequent time, the processor 11 can simply update the confirmed list stored in the main memory 12 or the auxiliary storage unit 13.

In ACT 15, the processor 11 checks whether the target device is a key device. The processing associated with ACT 15 may be substantially similar to the processing described already for ACT 4. If the present target device is a key device, the processor 11 determines YES in ACT 15 and proceeds to ACT 16.

In ACT 16, the processor 11 generates the key for unlocking the second restricted area ARC. The processor 11 uses, as a key, a hash value obtained using the product ID of the target device as an argument. In the present embodiment, there is no distinction between the key device for the first mode and the second mode, thus the key for unlocking the first restricted area ARB and the key for unlocking the second restricted area ARC can be the same. In other examples, by setting a key device for the first mode and a key device for the second mode to be different devices 2, the key for unlocking the first restricted area ARB and the key for unlocking the second restricted area ARC may be different keys.

In ACTS 6 and 16, the key for unlocking the first restricted area ARB and the key for unlocking the second restricted area ARC may be different from each other. However, when the key device for the first mode and the key device for the second mode are the same, the key for unlocking the first restricted area ARB and the key for unlocking the second restricted area ARC may still be caused to be different from one another by using other information included in the device information obtained from the key device as the arguments.

After the generation of the key is completed, the processor 11 proceeds to ACT 17. If the target device is not a key device, the processor 11 determines NO in ACT 15 and thus skips ACT 16 and proceeds directly to ACT 17.

In ACT 17, the processor 11 checks whether the connection of all of the essential devices to the interface unit 14 can be confirmed. The processor 11 checks, for example, whether all of the essential devices are included in the confirmed list. If an essential device is not included in the confirmed list, the processor 11 determines NO and proceeds to ACT 13. If all of the essential devices have been added to the confirmed list by repetition of ACTS 11 to 17, the processor 11 determines YES in ACT 17 and proceeds to ACT 18.

In ACT 18, the processor 11 unlocks the second restricted area ARC. The processor 11 requests the unlocking of the second restricted area ARC from the auxiliary storage unit 13 and provides the key generated in ACT 16. Therefore, the auxiliary storage unit 13 unlocks the second restricted area ARC in response to the request from the processor 11. In this unlocked state, the auxiliary storage unit 13 provides access to the encrypted programs and data stored in the second restricted area ARC. In addition, in this unlocked state, the auxiliary storage unit 13 can store the data and the like in the second restricted area ARC with encryption according to a request for writing to the second restricted area ARC.

In ACT 19, the processor 11 activates the information processing based on the second processing program PRC. For example, the processor 11 starts the execution of the information processing based on the second processing program PRC as a processing thread different from the overall control processing. Also, in this example, the processor 11 ends the control processing after the start of the second processing program PRC.

In this manner, the information processing based on the second processing program PRC begins only after all of the devices 2 set as essential devices are connected to the interface unit 14.

In addition, in this example, it is assumed that, in the information processing based on the second processing program PRC, the processor 11 writes highly secure data such, as a payment log or customer privacy information in the second restricted area ARC as encrypted information.

If at least one of the devices 2 set as an essential device has not been connected to the interface unit 14, the processor 11 will never determine YES in ACT 17 and once every connected device 2 has been selected and checked (NO in ACT 13), the processor 11 will proceed to ACT 20 and perform error processing.

In ACT 20, the processor 11 executes error processing, the content of which that is to be executed at this point as error processing may be arbitrarily selected, by the designer of the information processing device 1 or the like. As the error processing in the present example, it is assumed that a predetermined notification operation for notifying the user of information processing device 1 that the processing according to the second operation mode (second processing program PRC) cannot be activated since the connections of the required devices 2 is not correct. Then, after such error processing, the processor 11 ends the control processing.

If it is determined in ACT 10 that the second operation mode has not been set, the processor 11 determines NO in ACT 10 and proceeds to ACT 21 (in FIG. 5).

In ACT 21, the processor 11 selects one of the devices 2 connected to the interface unit 14 as the target device.

In ACT 22, the processor 11 checks whether the target device is an essential device. If the target device is not an essential device, the processor 11 determines NO and proceeds to ACT 23.

In ACT 23, the processor 11 checks whether a device 2 that has not yet been selected as the target device is present among the devices 2 connected to the interface unit 14. If such a device 2 is still present, the processor 11 determines YES in ACT 23 and returns to ACT 21.

If the target device is an essential device in ACT 22, the processor 11 determines YES and proceeds to ACT 24.

In ACT 24, the processor 11 checks whether a replacement prohibition has been set for the target device.

Here, for example, for reasons of security that might be impaired by the replacement of a device mid-transaction or otherwise, such as removal of a previously installed payment machine or the like, a replacement prohibition can be set. Such a prohibition may be set for some or all of the devices 2. The devices 2 for which a replacement prohibition is set may be freely set by a designer or a manager of the information processing device 1. Also, in the field FAF of each data record included in the control table TAA, in the initial state, the replacement management data using a predetermined first invalid value can be set in advance if the replacement of the correlating device 2 is prohibited, and the replacement management data using the predetermined second invalid value is set in advance if the replacement is not prohibited. In addition, any values may be used as the first invalid value and the second invalid value as long as the values can be clearly distinguished from hash values relating to serial numbers.

In ACT 24, if the second invalid value is not set in the field FAF of the data record REA to which the target device is correlated, the processor 11 determines YES since the replacement is prohibited and proceeds to ACT 25.

In ACT 25, the processor 11 checks whether a target device is newly connected. The processor 11 calculates the hash values based on the class ID and the product ID as arguments. The processor 11 searches the control table TAA for the data record REA in which these two hash values are set respectively in the fields FAB and FAC. If the first invalid value is set in the field FAF of the corresponding data record REA, the processor 11 determines YES in ACT 24 since the target device has been newly connected, and proceeds to ACT 26.

In ACT 26, the processor 11 updates the replacement management data set in the field FAF of the data record REA searched in ACT 25 so that the individual devices 2 to which the corresponding data record REA is correlated can be identified. The processor 11 calculates the hash values relating to the serial numbers by using the serial numbers of the target devices as arguments. The processor 11 updates the corresponding replacement management data to show the newly calculated hash value. Then, the processor 11 proceeds to ACT 28.

If the data record REA of the device 2 for which the replacement management data has been updated is selected as the target device, the processor 11 determines YES in ACT 24 and NO in ACT 25 and proceeds to ACT 27. In ACT 25, the processor 11 refers to the hash values respectively relating to the class ID and the product ID, and thus if the target device is replaced with a device 2 with the same class ID and product ID, the processor 11 proceeds to ACT 27 even if the serial number is different.

In ACT 27, the processor 11 checks whether the target device has been replaced. The processor 11 calculates the hash value relating to the serial number. The processor 11 checks whether the corresponding calculated hash value is identical to the hash value set in the field FAF of the data record REA searched in ACT 25. For example, if both hash values are identical to each other, the processor 11 determines YES in ACT 27 (that is, the target device has not been replaced) and proceeds to ACT 28.

In ACT 24, if the value set in the field FAF is not the first invalid value, the processor 11 determines NO since the replacement is not prohibited, skips ACTS 25 to 27, and proceeds to ACT 28.

Subsequently, the processor 11 performs the processes of ACTS 28 to 31 in the same manner as the processes of ACTS 14 to 17 in FIG. 4. Also, if the processor 11 determines YES in ACT 31 by confirming the connection of all of the essential devices, the processor 11 proceeds to ACT 32.

In ACT 32, the processor 11 unlocks the third restricted area ARD. The processor 11 requests unlocking of the third restricted area ARD from the auxiliary storage unit 13 and provides the key generated in ACT 30. Therefore, the auxiliary storage unit 13 unlocks the third restricted area ARD in response to the request from the processor 11. In this unlocked state, the auxiliary storage unit 13 provides access to the encrypted programs and data stored in the third restricted area ARD. In this unlocked state, the auxiliary storage unit 13 can be used to store encrypted data and the like in the third restricted area ARD according to a request of writing to the third restricted area ARD.

In ACT 33, the processor 11 activates the information processing based on the third processing program PRD. That is, the processor 11 starts the execution of the information processing based on the third processing program PRD as a thread different from the overall control processing. The processor 11 then ends the control processing.

If the third mode is set as the operation mode, information processing based on the third processing program PRD starts on the condition that all of the devices 2 determined as the essential devices have been connected to the interface unit 14, and no device 2 for which a replacement prohibition has been set has been replaced.

In the information processing based on the third processing program PRD, it is assumed that the processor 11 writes highly secure data. such as a payment log or customer privacy information in the third restricted area ARD.

If a device 2 of the same type as the target device has been removed, the processor 11 determines NO in ACT 27 and proceeds to ACT 34.

In ACT 34, the processor 11 executes the error processing. The process to be executed as the error processing may be freely determined, for example, by a designer of the information processing device 1. For example, a predetermined notification operation for notifying the user that the processing cannot be activated since a prohibited replacement of the device 2 has occurred can be output. Thereafter, the processor 11 ends the control processing.

If at least one of the devices 2 determined as an essential device is not connected to the interface unit 14, then the processor 11 does not determine YES in ACT 31 will eventually determine NO in ACT 23. In this case, the processor 11 proceeds to ACT 35.

In ACT 35, the processor 11 executes the error processing, for example, in the same manner as in ACT 20. Thereafter, the processor 11 ends the control processing.

As described above, with respect to any one of the first processing program PRB, the second processing program PRC, and the third processing program PRD, the information processing device 1 can execute an information processing program if a predetermined condition relating to the connection circumstance of the device 2 is satisfied. However, in a circumstance in which the devices 2 are not correctly connected to satisfy the condition, these information processing programs are not executed. Thus, with the information processing device 1, while the first processing program PRB, the second processing program PRC, and the third processing program PRD are pre-installed, a restriction can still be placed on the execution of these pre-installed information processing programs.

In addition, the first mode, the second mode, and the third mode, may each require different conditions to be met. Therefore, with the information processing device 1, the condition in which a pre-installed information processing program of one type can be executed by selecting of the operation mode.

The information processing device 1 sets the first processing program PRB, the second processing program PRC, and the third processing program PRD as execution targets in the first mode, the second mode, and the third mode, respectively. Therefore, with the information processing device 1, different kinds of information processing can be executed in response to the difference of the peripheral device connection conditions or the like. That is, the degree of the restriction relating to the connection of a device 2 can be differentiated in response to the difference in the functions embodied by the information processing. For example, it is assumed that the second processing program PRC and the third processing program PRD provide more advanced functions than the first processing program PRB. The third processing program PRD provides higher security functions than the first processing program PRB and the second processing program PRC.

Modifications

Less than all three of the described modes might be provided. If the first mode is omitted, the first restricted area ARB need not be provided, if the second mode is omitted, the second restricted area ARC need not be provided, and if the third mode is omitted, the third restricted area ARD need not be provided.

In some examples, the same information processing program may be executed in more than one of the available modes. In this case, an information processing program stored in any one restricted area may be executed in a plurality of different modes, and the same information processing programs respectively stored in different restricted areas may be executed.

The first mode can be primarily used, and another mode such as a mode in which the information processing can be executed in a condition in which a key device has not been replaced may be included in addition to the first to third modes or instead of any one of the first to third modes.

In some examples, the processor 11 need not perform the encryption for the restricted area but rather may simply reject requests for reading a particular program from the auxiliary storage unit 13 or otherwise restricting an access to a restricted area without actual encryption of data.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device connectable to peripheral devices for retail transaction processing, the information processing device comprising:
   an interface for connecting to a plurality of peripheral devices;
   a storage unit including an unrestricted storage area and a restricted storage area; and
   a processor configured to:
      acquire device information from each of the plurality of peripheral devices connected to the interface,
      identify whether the acquired device information meets a first condition,
      generate a first key from at least a portion of the acquired device information if the first condition is met, then use the generated first key to unlock a first area of the restricted storage area, and
      execute a first processing program stored in the unlocked first area.

2. The information processing device according to claim 1, wherein the first condition requires a particular type of peripheral device to be connected to the interface.

3. The information processing device according to claim 1, wherein the first condition requires each peripheral device type on a preset list of peripheral device types to be connected to the interface.

4. The information processing device according to claim 1, wherein the first condition requires that a previously connected peripheral device has not been removed and replaced with another peripheral device of the same device type.

5. The information processing device according to claim 1, wherein the first key is generated as a hash value of a portion of the acquired device information for a particular peripheral device.

6. The information processing device according to claim 1, wherein the first processing program is stored in the first area as encrypted information before the unlocking of the first area.

7. The information processing device according to claim 1, wherein the restricted area is an encrypted area.

8. The information processing device according to claim 7, wherein the processor is further configured to store information in the first area as encrypted data after execution of the first processing program.

9. The information processing device according to claim 1, wherein the processor is further configured to:
   identify whether the acquired device information meets a second condition,
   generate a second key from at least a portion of the acquired device information if the second condition is met, then use the generated second key to unlock a second area of the restricted storage area, and
   execute a second processing program stored in the unlocked second area.

10. The information processing device according to claim 1, wherein the first processing program causes the processor to perform processing for retail transactions.

11. A computer device connectable to peripheral devices for retail transaction processing, the computer device comprising:
    an interface for connecting to a plurality of peripheral devices;
    a storage device including an unrestricted storage area and a restricted storage area; and
    a processor configured to:
       acquire device information from each of the plurality of peripheral devices connected to the interface,
       identify whether the acquired device information meets a first condition,
       generate a first key from a portion of the acquired device information if the first condition is met, then use the generated first key to unlock a first area of the restricted storage area, and
       execute a first processing program stored in the unlocked first area, the first processing program causing the processor to perform processing for retail transactions.

12. The computer device according to claim 11, wherein the first condition requires a particular type of peripheral device to be connected to the interface.

13. The computer device according to claim 11, wherein the first condition requires each peripheral device type on a preset list of peripheral device types to be connected to the interface.

14. The computer device according to claim 11, wherein the first condition requires that a previously connected peripheral device has not been removed and replaced with another peripheral device of the same device type.

15. The computer device according to claim 11, wherein the first key is generated by the processor as a hash value of a portion of the acquired device information for a particular peripheral device.

16. The computer device according to claim 11, wherein the first processing program is stored in the first area as encrypted information before the unlocking of the first area.

17. The computer device according to claim 11, wherein the restricted area is an encrypted area.

18. The computer device according to claim 17, wherein the processor is further configured to store information in the first area as encrypted data after execution of the first processing program.

19. The computer device according to claim 11, wherein the processor is further configured to:
- identify whether the acquired device information meets a second condition,
- generate a second key from at least a portion of the acquired device information if the second condition is met, then use the generated second key to unlock a second area of the restricted storage area, and
- execute a second processing program stored in the unlocked second area.

20. The computer device according to claim 19, wherein the processor is further configured to:
- identify whether the acquired device information meets a third condition,
- generate a third key from at least a portion of the acquired device information if the third condition is met, then use the generated third key to unlock a third area of the restricted storage area, and
- execute a third processing program stored in the unlocked third area.

* * * * *